US012779861B2

(12) United States Patent
Shiba et al.

(10) Patent No.: US 12,779,861 B2
(45) Date of Patent: Nov. 3, 2026

(54) STORAGE BAG AND PRINTING APPARATUS, THE STORAGE BAG INCLUDING A BAG AND A DISCHARGE PORT FOR DISCHARGING LIQUID STORED IN THE BAG BODY

(71) Applicant: CANON KABUSHIKI KAISHA, Tokyo (JP)

(72) Inventors: Akira Shiba, Tokyo (JP); Shoki Wakatsuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 18/948,382

(22) Filed: Nov. 14, 2024

(65) Prior Publication Data

US 2025/0162324 A1 May 22, 2025

(30) Foreign Application Priority Data

Nov. 20, 2023 (JP) ................................ 2023-196475

(51) Int. Cl.
*B41J 2/175* (2006.01)

(52) U.S. Cl.
CPC ....... *B41J 2/17513* (2013.01); *B41J 2/17559* (2013.01); *B41J 2002/17516* (2013.01)

(58) Field of Classification Search
CPC .................... B41J 2/17513; B41J 2002/17516
See application file for complete search history.

(56) References Cited

U.S. PATENT DOCUMENTS 9,242,471 B2 1/2016 Yoneda et al. ............ B65B 3/18
9,333,756 B2 5/2016 Nishimura ............... B41J 2/175
9,694,585 B2 7/2017 Shiba et al. ............ B41J 2/175
9,724,929 B2 8/2017 Yoshii et al. ............ B41J 2/175
9,914,305 B2 3/2018 Orihara et al. .......... B41J 2/175
10,093,105 B2 10/2018 Shimamura et al. .... B41J 2/175
10,112,403 B2 10/2018 Ikebe et al. .............. B41J 29/13
(Continued)

FOREIGN PATENT DOCUMENTS

JP 2011-031895 2/2011
JP 2012-016825 1/2012
JP 2019-073312 5/2019

OTHER PUBLICATIONS

Extended European Search Report dated Feb. 12, 2025 in counterpart EP Application No. 24213286.8.

*Primary Examiner* — Sharon Polk
(74) *Attorney, Agent, or Firm* — Venable LLP

(57) ABSTRACT

A storage bag including a bag body and a discharge port for discharging liquid stored in the bag body. The bag body includes a first surface portion, a second surface portion opposite to the first surface portion, a third surface portion to serve as a gusset portion to connect the first and second surface portions, and a fourth surface portion opposite to the third surface portion to serve as a gusset portion to connect the first and second surface portions, the first surface portion and the third surface portion are coupled by a first coupling portion to extend in a first direction, the first surface portion and the fourth surface portion are coupled by a second coupling portion to extend in the first direction, the first coupling portion includes a first convex portion to protrude toward the inside of the first surface portion along a second direction intersecting the first.

17 Claims, 8 Drawing Sheets

(56) References Cited

U.S. PATENT DOCUMENTS

| | | | | |
|---|---|---|---|---|
| 10,160,222 | B2 | 12/2018 | Shiba et al. | B41J 2/195 |
| 10,391,776 | B2 | 8/2019 | Hayashi et al. | B41J 2/175 |
| 10,399,346 | B2 | 9/2019 | Arai et al. | B41J 2/175 |
| 10,399,347 | B2 | 9/2019 | Miyashita et al. | B41J 2/175 |
| 10,538,092 | B2 | 1/2020 | Miyashita et al. | B41J 2/175 |
| 10,611,162 | B2 | 4/2020 | Ikebe et al. | B41J 2/175 |
| 10,618,300 | B2 | 4/2020 | Shimamura et al. | B41J 2/175 |
| 10,675,882 | B2 | 6/2020 | Shiba et al. | B41J 2/195 |
| 10,843,474 | B2 | 11/2020 | Arai et al. | B41J 2/175 |
| 11,192,383 | B2 | 12/2021 | Shimamura et al. | B41J 2/175 |
| 11,623,453 | B2 | 4/2023 | Shimamura et al. | B41J 2/175 |
| 11,833,832 | B2 | 12/2023 | Okada et al. | B41J 2/175 |
| 2008/0136878 | A1* | 6/2008 | Nozawa | B41J 2/1752 347/86 |
| 2015/0375513 | A1* | 12/2015 | Nishimura | B41J 2/17523 347/86 |
| 2020/0094566 | A1* | 3/2020 | Ichihara | B41J 2/17553 |

* cited by examiner

STORAGE BAG AND PRINTING APPARATUS, THE STORAGE BAG INCLUDING A BAG AND A DISCHARGE PORT FOR DISCHARGING LIQUID STORED IN THE BAG BODY

CROSS REFERENCE TO PRIORITY APPLICATION

This application claims the benefit of Japanese Patent Application No. 2023-196475, filed Nov. 20, 2023, which is hereby incorporated by reference herein in its entirety.

BACKGROUND

Field of the Invention

The present disclosure relates to a storage bag and a printing apparatus.

Description of the Related Art

Japanese Patent Laid-Open No. 2012-16825 has disclosed an ink pack (storage bag) comprising an upper-side gusset portion and a lower-side gusset portion. According to the ink bag of Japanese Patent Laid-Open No. 2012-16825, the rigidity of the lower-side gusset portion is greater than the rigidity of the upper-side portion, and therefore, while ink is being used, the lower-side gusset portion is folded up after the upper-side gusset portion is folded up. According to the configuration such as this, while ink is being used, after the upper side of the ink pack is crushed, the lower side of the ink pack is crushed gradually, and therefore, the used-up property of ink is implemented.

However, with the ink pack of Japanese Patent Laid-Open No. 2012-16825, for example, in a case when ink is injected into the ink pack and the gusset portion swells out, it may happen sometimes that a virtual fold intersecting the folding line provided at the gusset portion occurs. The vertical fold such as this serves as a resistance to folding up while ink is being used and the ink pack is being crushed, and, therefore, there is a possibility that a smooth folding up at the gusset portion is blocked. In a case when a smooth folding up at the gusset portion is blocked, it becomes difficult to use up ink.

SUMMARY

An object of the present disclosure is to provide a storage bag capable of suppressing the occurrence of a vertical fold at the gusset portion and improving the use-up property of ink.

The storage bag of the present disclosure includes a bag body and a discharge port for discharging liquid stored in the bag body, wherein the bag body includes a first surface portion, a second surface portion opposite to the first surface portion, a third surface portion configured to serve as a gusset portion configured to connect the first surface portion and the second surface portion, and a fourth surface portion opposite to the third surface portion and configured to serve as a gusset portion configured to connect the first surface portion and the second surface portion, the first surface portion and the third surface portion are coupled by a first coupling portion configured to extend in a first direction, the first surface portion and the fourth surface portion are coupled by a second coupling portion configured to extend in the first direction, the first coupling portion includes a first convex portion configured to protrude toward the inside of the first surface portion along a second direction intersecting the first direction, the second coupling portion includes a second convex portion configured to protrude toward the inside of the first surface portion along the second direction, the second surface portion and the third surface portion are coupled by a third coupling portion configured to extend in the first direction, the second surface portion and the fourth surface portion are coupled by a fourth coupling portion configured to extend in the first direction, the third coupling portion includes a third convex portion configured to protrude toward the inside of the second surface portion along the second direction, the fourth coupling portion includes a fourth convex portion configured to protrude toward the inside of the second surface portion along the second direction, the first convex portion and the third convex portion are located at the same position in the first direction, and the second convex portion and the fourth convex portion are located at the same position in the first direction.

Further features of the present disclosure will become apparent from the following description of exemplary embodiments with reference to the attached drawings.

DESCRIPTION OF THE EMBODIMENTS

First Embodiment

Figure 1:
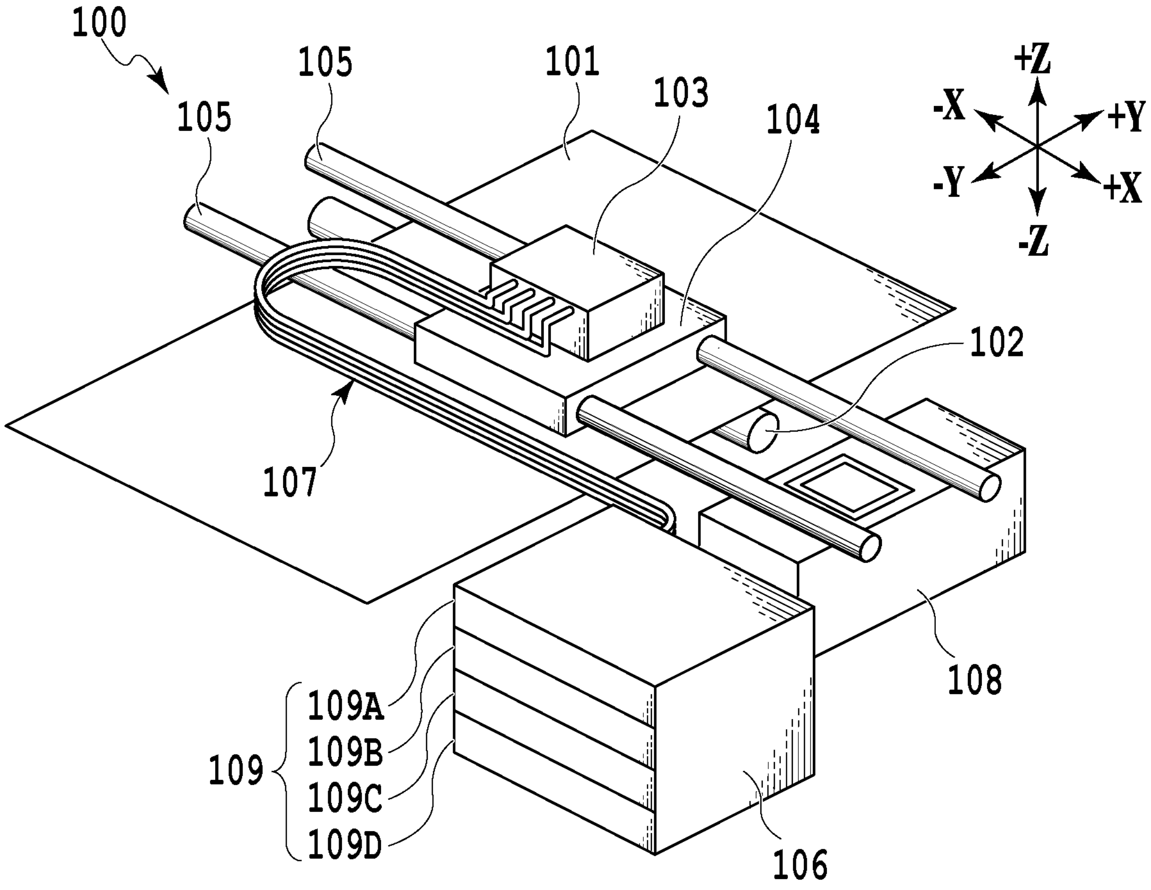
FIG. 1 is a schematic diagram of a printing apparatus that can be applied to one embodiment.

FIG. 1 is a schematic diagram of a printing apparatus 100 that can be applied to the present embodiment.

Coordinate axes in the drawings are explained. In the drawings referred to in the present specification, the X-direction and the Y-direction indicate two directions perpendicular to each other on a horizontal plane. The Z-direction indicates the vertical direction. The −Y-direction indicates the backward direction of the printing apparatus 100, the +Y-direction indicates the forward direction, the −X-direction indicates the leftward direction in a case of being viewed from front, the +X-direction indicates the rightward direction, the +Z-direction indicates the upward direction, and the −Z-direction indicates the downward direction, respectively. The −Y-direction also indicates the downstream side in the conveyance direction of a printing medium 101 and the +Y-direction also indicates the upstream side in the conveyance direction of the printing medium 101. The Y-direction is called the conveyance direction and the X-direction is called the scanning direction of a print head 103 as appropriate. The X-direction indicates the width of a storage bag 200 (see FIG. 2) and the Y-direction corresponds to the length (depth) direction of the storage bag 200 in a posture in which the storage bag 200 is mounted on a liquid supply unit 106, to be described later, and the Z-direction corresponds to the height direction of the storage bag 200. In the following explanation, unless described particularly, the upward, downward, leftward, and rightward directions indicate directions in the posture in which the printing apparatus 100 and the storage bag 200 are used in the normal state.

As shown in FIG. 1, the printing apparatus 100 comprises a conveyance roller 102 conveying the printing medium 101 in the conveyance direction. The printing apparatus 100 comprises the print head 103 capable of ejecting liquid (for example, ink), a carriage 104 on which the print head 103 can be mounted attachably and detachably, and two guide rails 105 supporting the carriage 104 slidably. The printing apparatus 100 comprises the liquid supply unit 106 for supplying liquid to the print head 103, a tube 107 connecting the print head 103 and the liquid supply unit 106, and a restoration unit 108 for maintaining and restoring the performance of the print head 103.

In the printing operation, the printing apparatus 100 repeats the reciprocating movement (main scanning) of the print head 103 and the conveyance (sub scanning) of the printing medium 101 with each predetermined pitch. By causing the print head 103 to selectively eject liquids of a plurality of colors and causing the liquids to land on the printing medium 101 while in synchronization with these movements, printing for the printing medium 101 is performed.

The printing medium 101 is not limited as long as it is possible to cause liquid droplets to land on the printing medium 101 and form an image thereon. For example, as the printing medium 101, it is possible to use media of various materials and aspects, such as paper, cloth, an optical disk label surface, a plastic sheet, an overhead projector (OHP) sheet, and an envelope.

By a drive unit (for example, a motor (not shown schematically), and the like) driving, the carriage 104 reciprocates along the two guide rails 105. The printing medium 101 that receives liquid ejected from a liquid ejection unit (not shown schematically) of the print head 103 is conveyed by the conveyance roller 102 in the conveyance direction facing a liquid ejection surface of the print head 103 and perpendicular to the movement direction of the carriage 104.

The print head 103 has a plurality of nozzle arrays for ejecting liquids of colors different from one another as a plurality of liquid ejection units. In accordance with the color of the liquid that is ejected from the print head 103, a plurality of independent storage containers 109 having a discharge port 202 (see FIG. 2) is mounted on the liquid supply unit 106 attachably and detachably.

The storage container 109 includes a first storage container 109A, a second storage container 109B, a third storage container 109C, and a fourth storage container 109D storing liquids of black, cyan, magenta, and yellow, respectively. The colors of liquid are not limited to the above-described four colors. In the following, in a case when it is not necessary to particularly distinguish the first storage container 109A, the second storage container 109B, the third storage container 109C, and the fourth storage container 109D from one another, they are called the storage container 109.

The liquid supply unit 106 and the print head 103 are connected by a plurality of the tubes 107 corresponding to each color. In the present embodiment, the liquid supply unit 106 and the print head 103 are connected by the four tubes 107 corresponding to each of the above-described four colors.

In the present embodiment, the storage container 109 includes a rigid case and the storage bag 200 (see FIG. 2) stored in the rigid case. Inside the rigid case, the storage bag 200 (see FIG. 2) is positioned in a predetermined posture.

In the present embodiment, the shape of the rigid case is a tray type. The storage bag 200 (see FIG. 2) is mounted in the tray-type rigid case attachably and detachably. However, the shape of the rigid case may be a box type. It is also possible to store the storage bag 200 (see FIG. 2) inside the box-type rigid case attachably and detachably.

By a user advancing the rigid case of the storage container 109 and mounting the rigid case on the liquid supply unit 106, it is made possible to independently supply the liquid of each color stored in the storage bag 200 (see FIG. 2) to each nozzle array of the print head 103. The liquid supply unit 106 comprises a pump mechanism (not shown schematically). It is possible for the pump mechanism to suck in liquid from the storage container 109 and send the liquid to the print head 103.

<Storage Bag 200>

Figure 2:
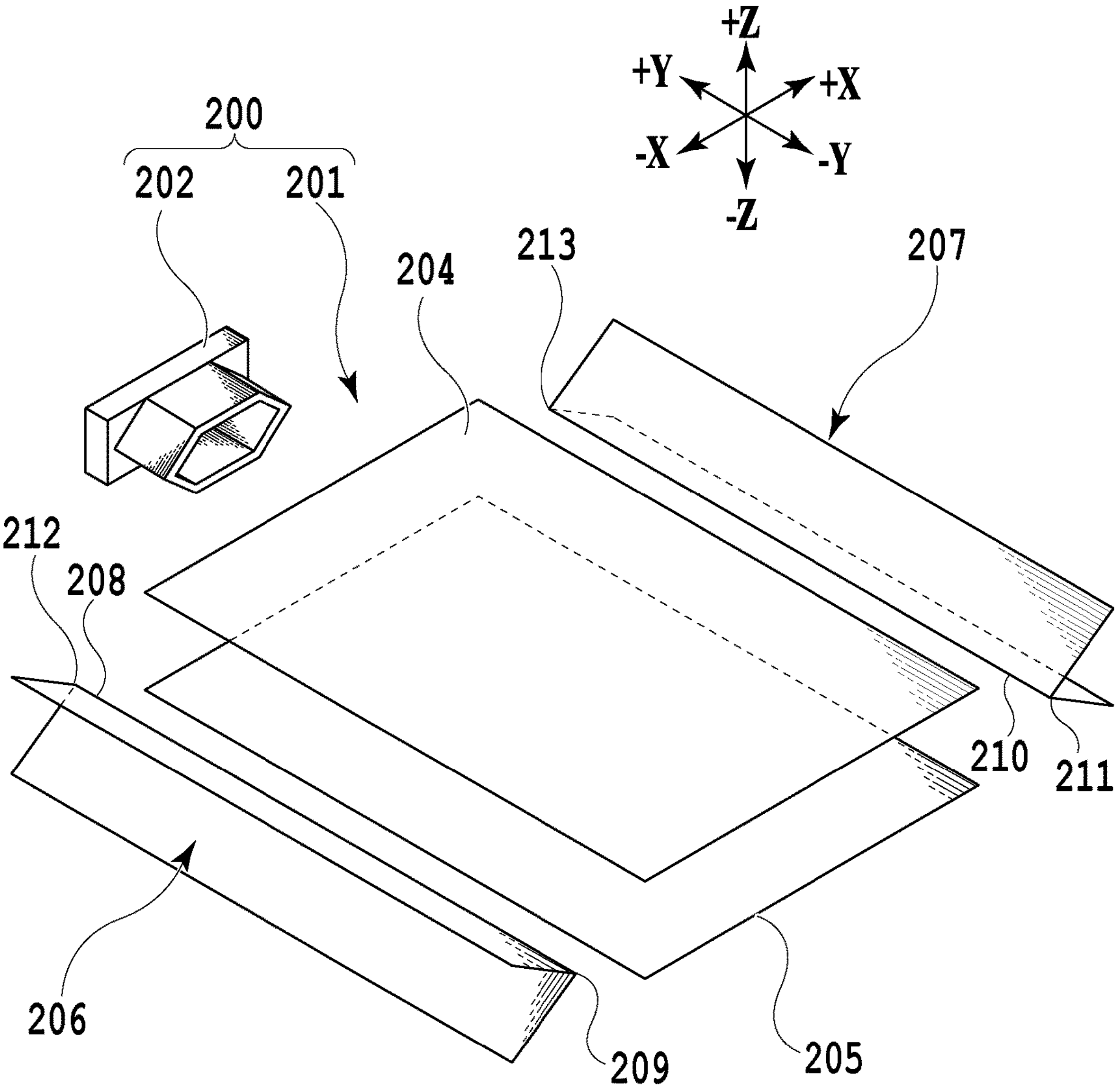
FIG. 2 is an exploded perspective diagram of a storage bag in one embodiment.

FIG. 2 is an exploded perspective diagram of the storage bag 200 in the present embodiment.

As shown in FIG. 2, the storage bag 200 comprises a bag body 201 with flexibility capable of hermetically storing liquid and the discharge port 202 discharging liquid to the outside from the inside of the bag body 201. The discharge port 202 is manufactured by injection molding. By the above-described pump mechanism driving, ink is sucked in from the discharge port 202 and the ink is supplied to the print head 103 via the tube 107 (see FIG. 1).

The bag body 201 includes a top surface film 204 located on the top surface side and an undersurface film 205 opposite to the top surface film 204 and located on the undersurface side in a posture in which the bag body 201 is used. The bag body 201 includes a left surface film 206 connecting the end portion of the top surface film 204 and the end portion of the undersurface film 205. The storage bag 200 includes a right surface film 207 opposite to the left surface film 206 and connecting the end portion of the top surface film 204 and the end portion of the undersurface film 205.

The top surface film 204, the left surface film 206, the undersurface film 205, and the right surface film 207 include a material suppressing leakage of liquid stored internally and likely to be coupled (in the present embodiment, likely to be thermally welded). The top surface film 204, the left surface film 206, the undersurface film 205, and the right surface film 207 may be coupled by an adhesive agent.

As examples of the material of each of the top surface film 204, the left surface film 206, the undersurface film 205, and the right surface film 207, there are polyethylene, polypropylene, and the like. By taking into consideration the gas-barrier property and the fastness property, it is also possible to use a multilayer film including a plurality of materials, such as aluminum, PET (polyethylene terephthalate), nylon and the like.

In a case when the bag body 201 is formed, each of the top end portion of the left surface film 206 and the top end portion of the right surface film 207 is coupled to each of the left and right end portions of the top surface film 204. Then, each of the bottom end portion of the left surface film 206 and the bottom end portion of the right surface film 207 is coupled to each of the left and right end portions of the undersurface film 205. As described above, in a case when the bag body 201 is formed, the top surface film 204, the left surface film 206, the undersurface film 205, and the right surface film 207 are coupled into the shape of a cylinder.

That is, at one of the openings (front side in FIG. 2) in the bag body 201 coupled into the shape of a cylinder, the top surface film 204 and the undersurface film 205 are coupled via the double-folded left surface film 206 and the double-folded right surface film 207. Specifically, the left and right portions of the top surface film 204 and the undersurface film 205 are coupled via a first end portion 209 of a first folding line 208 in the left surface film 206 and a second end portion 211 of a second folding line 210 in the right surface film 207. On the other hand, the center portions of the top surface film 204 and the undersurface film 205 are coupled directly without the intervention of another film.

At the other of the openings (depth side in FIG. 2) in the bag body 201 coupled into the shape of a cylinder, the top surface film 204 and the undersurface film 205 are coupled in a state where the double-folded left surface film 206, the double-folded right surface film 207, and part of the discharge port 202 are sandwiched. Specifically, the left and right portions of the top surface film 204 and the undersurface film 205 are coupled via a third end portion 212 of the first folding line 208 and a fourth end portion 213 of the second folding line 210. On the other hand, the center portions of the top surface film 204 and the undersurface film 205 are coupled directly in a state where part of the discharge port 202 is sandwiched.

In the present embodiment, the hermetically sealed storage bag 200 is formed as described above. In the storage bag 200, the left surface film 206 and the right surface film 207 function as a gusset portion.

Figure 3:
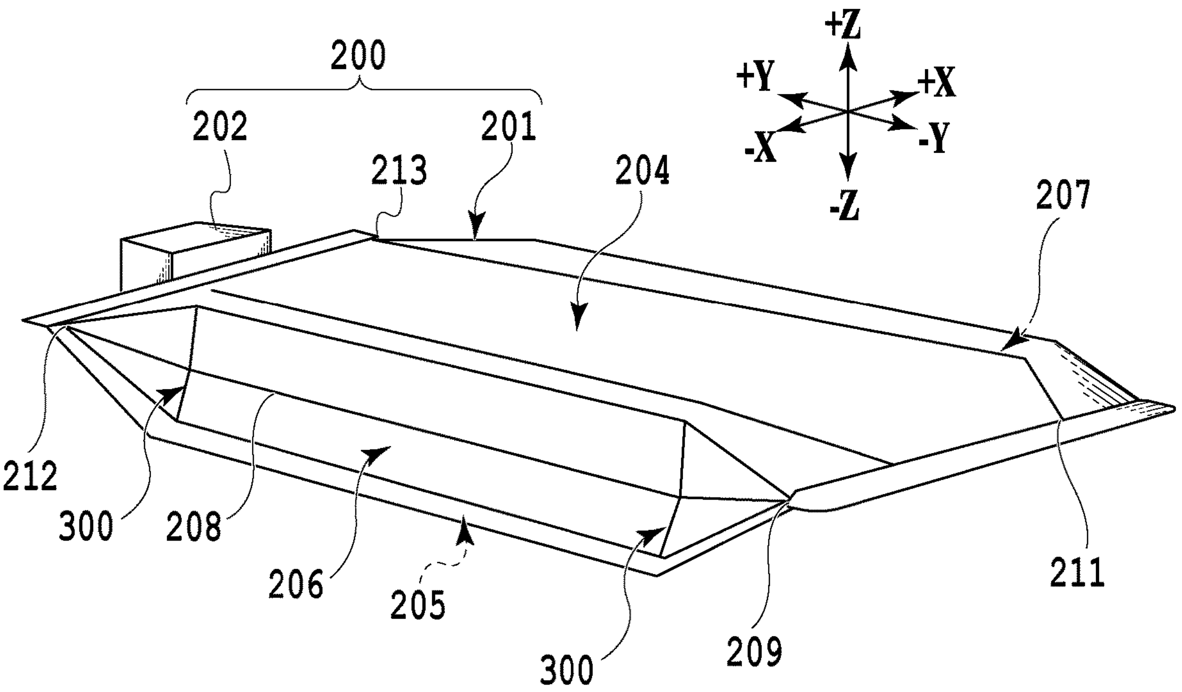
FIG. 3 is a diagram explaining the occurrence of a vertical fold.

FIG. 3 is a diagram explaining the occurrence of a vertical fold 300. In FIG. 3, the storage bag 200 is shown in the posture in which the storage bag 200 is used (that is, posture in which the storage bag 200 is mounted on the liquid supply unit 106).

As shown in FIG. 3, in the storage bag 200 before the start of its use (that is, in the initial state), in order to allow flexibility, liquid not less than 50% and not more than 80% of the maximum amount that can be stored is stored. The greater the amount of the remaining liquid in the storage bag 200, the more the storage bag 200 swells out. The more the storage bag 200 swells out, the greater the angle formed by the upper side and the lower side with the first folding line 208 as a boundary becomes in the left surface film 206. Also, in the right surface film 207, as in the left surface film 206, the angle formed by the upper side and the lower side with the second folding line 210 (not shown schematically in FIG. 3) as a boundary becomes large.

For example, in a case when the posture changes from the posture in which the storage bag 200 is used to another different posture, it may happen sometimes that the liquid moves inside the storage bag 200 and the left surface film 206 and the right surface film 207 spread. Specifically, in a case when the brand-new storage bag 200 is mounted on the rigid case of the storage container 109 (see FIG. 1), it may happen sometimes that the discharge port 202 is directed upward in the direction of gravity by a user. In this case, inside the bag body 201, the liquid moves to a position distant from the discharge port 202 and accumulates at the position. In a case when the posture of the storage bag 200 changes as described above, the left surface film 206 and the right surface film 207 are pushed and spread from the inside of the bag body 201 toward the outside.

As described above, the left surface film 206 and the right surface film 207 function as a gusset portion and are capable of increasing the capacity of the bag body 201. However, each of one end portion in the top surface film 204 and one end portion in the undersurface film 205 is coupled via each of the first end portion 209 and the second end portion 211. Then, each of the other end portion in the top surface film 204 and the other end portion in the undersurface film 205 is coupled via each of the third end portion 212 and the fourth end portion 213. Consequently, the range is limited in which the left surface film 206 and the right surface film 207 can spread as a gusset portion.

In the left surface film 206, as the angle of the fold toward the inside of the bag body 201 approaches one hundred eighty degrees (that is, as the fold disappears), the vertical fold 300 substantially perpendicular to the first folding line 208 becomes more likely to occur. On the other hand, in the right surface film 207 also, as the angle of the fold toward the inside of the bag body 201 approaches one hundred eighty degrees (that is, as the fold disappears), the vertical fold 300 substantially perpendicular to the second folding line 210 becomes more likely to occur.

In a case when the vertical fold 300 occurs, while the liquid is being used and the left surface film 206 and the right surface film 207 are being folded up, the vertical fold 300 serves as a resistance to the folding and blocks smooth shrinkage of the storage bag 200.

Originally, as the amount of remaining liquid decreases, each of the left surface film 206 and the right surface film 207 is folded up along each of the first folding line 208 and the second folding line 210 and the capacity of the storage bag 200 is reduced. However, in a case when the vertical fold 300 occurs, the folding of the left surface film 206 and the right surface film 207 is blocked and it becomes difficult to use up the liquid. In order to suppress the occurrence of the vertical fold 300 such as this, in the present embodiment, the shape of the coupling portion of each film is allowed to have a feature.

Figure 4:
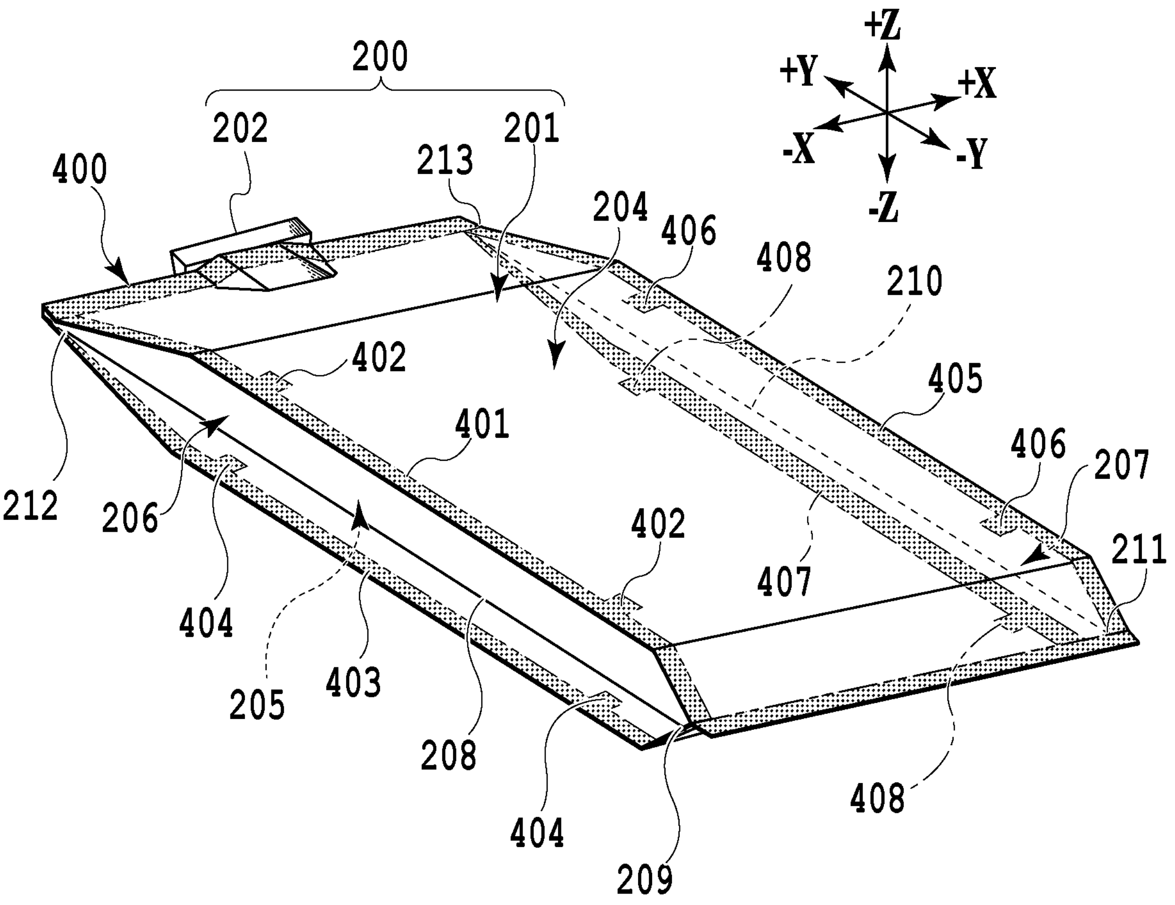
FIG. 4 is a perspective diagram of a storage bag, showing a coupling portion in one embodiment.

FIG. 4 is a perspective diagram of the storage bag 200, showing a coupling portion 400 of the bag body 201 in the present embodiment.

As shown in FIG. 4, the bag body 201 comprises the coupling portion 400 at which the top surface film 204, the left surface film 206, the right surface film 207, and the undersurface film 205 are coupled. As described above, in the present embodiment, the top surface film 204, the left surface film 206, the right surface film 207, and the undersurface film 205 are thermally welded at the coupling portion 400. That is, in the present embodiment, the coupling portion 400 is a welding area.

The coupling portion 400 includes a first area 401 coupling the end portion of the left surface film 206 and the end portion of the top surface film 204 along the entire area in a first direction (Y-direction) and a first convex portion 402 configured to protrude toward the inside of the top surface film 204 from the first area 401. The coupling portion 400 includes a second area 403 coupling the end portion of the left surface film 206 and the end portion of the undersurface film 205 along the entire area in the first direction (Y-direction) and a second convex portion 404 configured to protrude toward the inside of the undersurface film 205 from the second area 403.

The coupling portion 400 includes a third area 405 coupling the end portion of the right surface film 207 and the end portion of the top surface film 204 along the entire area in the first direction (Y-direction) and a third convex portion 406 configured to protrude toward the inside of the top surface film 204 from the third area 405. The coupling portion 400 includes a fourth area 407 coupling the end portion of the right surface film 207 and the end portion of the undersurface film 205 along the entire area in the first direction (Y-direction) and a fourth convex portion 408 configured to protrude toward the inside of the undersurface film 205 from the fourth area 407. In the present embodiment, the first direction (Y-direction) is the direction from the bottom portion of the bag body 201 toward the discharge port 202.

Further, it is preferable for the first convex portion 402, the second convex portion 404, the third convex portion 406, and the fourth convex portion 408 to be provided at the same position in the Y-direction. According to this configuration, it is made easy to suppress the occurrence of the vertical fold 300 (see FIG. 3) extending along the Z-direction. As long as it is possible to suppress the occurrence of the vertical fold 300 (see FIG. 3), the position at which the first convex portion 402, the second convex portion 404, the third convex portion 406, and the fourth convex portion 408 are provided may not be the same position in the Y-direction.

Further, in a case when the top surface film 204, the left surface film 206, the right surface film 207, and the undersurface film 205 are coupled, a coupling tool (not shown schematically) coupling these four films while pressing them together is used.

In the present embodiment, as the coupling tool, a welding tool (not shown schematically) welding the top surface film 204, the left surface film 206, the right surface film 207, and the undersurface film 205 while pressing them together is used. Specifically, by designing part of the pressing surface of the welding tool the same shape as that of the first convex portion 402, the second convex portion 404, the third convex portion 406, and the fourth convex portion 408, it is possible to thermally weld these four films together while providing these four convex portions. According to the welding method such as this, it is possible to form the shape of the coupling portion 400 without increasing the number of processes.

Figure 5:
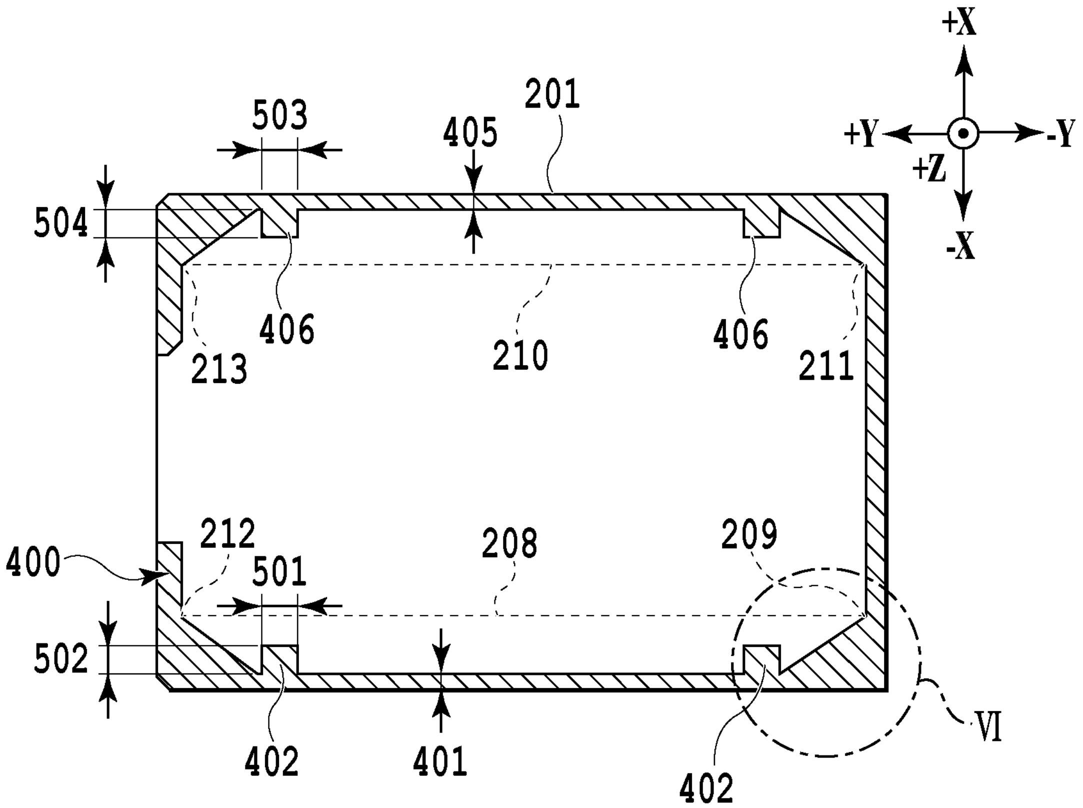
FIG. 5 is a diagram explaining a coupling portion in one embodiment.

FIG. 5 is a diagram explaining the coupling portion 400 in the present embodiment.

As shown in FIG. 5, the first convex portion 402 in the coupling portion 400 has a first width 501, which is the length in the first direction (Y-direction), and a first protrusion amount 502, which is the length in a second direction (X-direction). Like the first convex portion 402, the second convex portion 404 (not shown schematically in FIG. 5) also has a second width (not shown schematically in FIG. 5), which is the length in the first direction (Y-direction), and a second protrusion amount 605 (see FIG. 6C) protruding in the second direction (X-direction) from the second area 403.

As shown in FIG. 5, the third convex portion 406 has a third width 503, which is the length in the first direction (Y-direction), and a third protrusion amount 504 protruding along the second direction (X-direction) from the third area 405. Like the third convex portion 406, the fourth convex portion 408 (not shown schematically in FIG. 5) also has a fourth width (not shown schematically in FIG. 5), which is the length in the first direction (Y-direction), and a fourth protrusion amount (not shown schematically in FIG. 5) protruding in the second direction (X-direction) from the fourth convex portion 408.

The first width 501, the second width, the third width 503, and the fourth width are not less than about five mm and not more than about thirty mm. The first protrusion amount 502, the second protrusion amount, the third protrusion amount 504, and the fourth protrusion amount are not less than about five mm and not more than about thirty mm.

As shown in FIG. 5, it is preferable for each of a plurality of the first convex portions 402 to be provided within a range not less than about ten mm and not more than about seventy mm from each of the fist end portion 209 and the third end portion 212 toward the inside of the first folding line 208. Like the first convex portion 402, it is preferable for each of a plurality of the second convex portions 404 (not shown schematically in FIG. 5) to be provided within a range not less than about ten mm and not more than about seventy mm from each of the fist end portion 209 and the third end portion 212 toward the inside of the first folding line 208.

As shown in FIG. 5, it is preferable for each of a plurality of the third convex portions 406 to be provided within a range not less than about 10 mm and not more than about 70 mm from each of the second end portion 211 and the fourth end portion 213 toward the inside of the second folding line 210. Like the third convex portion 406, it is preferable for each of a plurality of the fourth convex portions 408 (not shown schematically in FIG. 5) to be provided within a range not less than about 10 mm and not more than about 70 mm from each of the second end portion 211 and the fourth end portion 213 toward the inside of the second folding line 210.

The reason is that by providing the above-described plurality of the convex portions within the above-described range, it is possible to efficiently suppress the occurrence of the vertical fold 300. For example, in a case where the bottom portion (end portion on the side in the −Y-direction) of the storage bag 200 is directed downward in the direction of gravity, the liquid gathers downward. In view of that the left surface film 206 and the right surface film 207 spread at the end portion on the side in the Y-direction in the storage bag 200 and the vertical fold 300 is likely to occur, by concentratedly providing each convex portion within the range not less than about 10 mm and not more than 70 mm from the bottom portion toward the inside of each of the first folding line 208 and the second folding line 210, it is possible to efficiently suppress the occurrence of the vertical fold 300.

The number of convex portions described above and the position of each convex portion are not limited to the example of the present embodiment. It is possible to determine the number of convex portions and the position thereof described above in accordance with the tendency of the position and the number at which and with which the vertical fold 300 occurs.

Figures 6A, 6B, 6C:
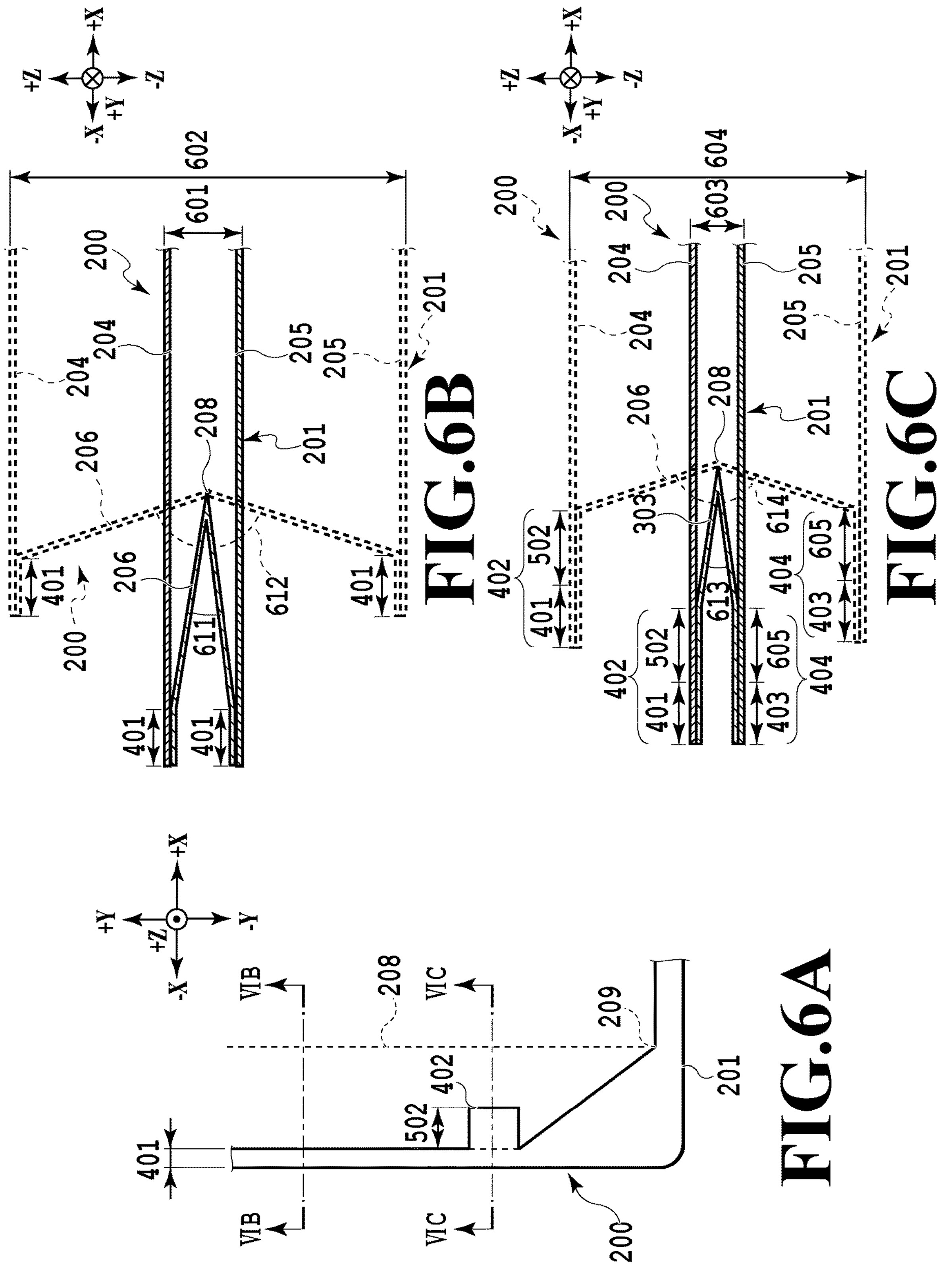
FIG. 6A is a plan diagram showing part of an area VI in FIG. 5.
FIG. 6B is a cross-sectional diagram along a VIB-VIB line in FIG. 6A.
FIG. 6C is a cross-sectional diagram along a VIC-VIC line in FIG. 6A.

FIG. 6A is a plan diagram showing an area VI in FIG. 5.

As shown in FIG. 6A, it is desirable for the first protrusion amount 502 in the first convex portion 402 to be about two thirds or less of the shortest distance from the first area 401 to the first folding line 208.

FIG. 6B is a cross-sectional diagram along a VIB-VIB line in FIG. 6A. In FIG. 6B, a state where the amount of remaining liquid is small is shown. The solid-line portion in FIG. 6B shows the posture in which the storage bag 200 is used (posture in which the storage bag 200 is placed horizontally). On the other hand, the broken-line portion in FIG. 6B shows the posture, which is moved from the posture in which the storage bag 200 is place horizontally, and, in which the discharge port 202 (not shown schematically in FIG. 6B) is held upright so as to face upward.

As shown in the solid-line portion in FIG. 6B, in the posture in which the storage bag 200 is used, the bag body 201 has a first distance 601 from the top surface film 204 to the undersurface film 205. In the posture in which the storage bag 200 is used, the bag body 201 has a first angle 611 formed by the upper side and the lower side of the left surface film 206 with the first folding line 208 as a boundary.

As shown in the broken-line portion in FIG. 6B, in the state of the storage bag 200 where the discharge port 202 is held upright so as to face upward, the bag body 201 has a second distance 602 from the top surface film 204 to the undersurface film 205. The second distance 602 is greater than the first distance 601.

In the state of the storage bag 200 where the discharge port 202 is held upright so as to face upward, the left surface film 206 opens. Then, the bag body 201 has a second angle 612 formed by the upper side and the lower side of the left surface film 206 with the first folding line 208 as a boundary. The second angle 612 is greater than the first angle 611.

For example, in a case when the posture in which the storage bag 200 is used changes to the posture in which the discharge port 202 is held upright so as to face upward, the ink within the bag body 201 moves in the direction of gravity. Because of this, at the bottom portion of the storage bag 200, the left surface film 206 swells out in the direction in which the left surface film 206 opens against the first folding line 208. By the left surface film 206 opening as described above, the second distance 602 from the top surface film 204 to the undersurface film 205 becomes greater than the first distance 601 before the left surface film 206 opens.

FIG. 6C is a cross-sectional diagram along a VIC-VIC line in FIG. 6A. The solid-line portion in FIG. 6C shows the state where the storage bag 200 is used (state where the storage bag 200 is placed horizontally). On the other hand, the broken-line portion in FIG. 6C shows the posture after the storage bag 200 is moved from the posture in which the storage bag 200 is placed horizontally and the discharge port 202 (not shown schematically in FIG. 6C) is held upright so as to face upward. In FIG. 6C, it is assumed that the amount of remaining liquid in each of the solid-line portion and the broken-line portion is the same as the amount of remaining liquid in each of the solid-line portion and the broken-line portion shown in FIG. 6B.

As shown in the solid-line portion in FIG. 6C, at the portion at which the first convex portion 402 and the second convex portion 404 in the left surface film 206 are provided, the bag body 201 has a third distance 603 from the top surface film 204 to the undersurface film 205. However, the first convex portion 402 and the second convex portion 404 are provided, and, therefore, the third distance 603 is less than the first distance 601 (see FIG. 6B). In the posture in which the storage bag 200 is used, the bag body 201 has a third angle 613 formed by the upper side and the lower side of the left surface film 206 with the first folding line 208 as a boundary.

As shown in the broken-line portion in FIG. 6C, in the state of the storage bag 200 where the discharge port 202 is held upright so as to face upward, the bag body 201 has a fourth distance 604 from the top surface film 204 to the undersurface film 205. However, the fourth distance 604 is greater than the third distance 603. Then, the first convex portion 402 and the second convex portion 404 are provided, and therefore, the fourth distance 604 is less than the second distance 602 (see FIG. 6B).

In the state of the storage bag 200 where the discharge port 202 is held upright so as to face upward, the left surface film 206 opens and the bag body 201 has a fourth angle 614 formed by the upper side and the lower side of the left surface film 206 with the first folding line 208 as a boundary. The fourth angle 614 is greater than the third angle 613. As described above, in the left surface film 206, the portion at which the first convex portion 402 and the second convex portion 404 are provided has a movable area in the ±Y-direction less than that of the portion at which the first convex portion 402 or the second convex portion 404 is not provided. That is, as the results of the left surface film 206 being suppressed from opening, the fourth distance 604 at the portion at which the first convex portion 402 and the second convex portion 404 are provided becomes less than the second distance 602 (see FIG. 6B).

As described above, as the angle of the left surface film 206 approaches one hundred eighty degrees, the possibility that the vertical fold 300 occurs becomes strong. However, in the left surface film 206, it is possible to make the distance from the top surface film 204 to the undersurface film 205 at the portion at which the first convex portion 402 and the second convex portion 404 are provided shorter than that at the portion at which the first convex portion 402 or the second convex portion 404 is not provided. That is, it is possible to suppress the occurrence of the vertical fold 300 (not shown schematically in FIG. 6C) by providing the first convex portion 402 and the second convex portion 404 so as to increase the strength of the left surface film 206.

Further, also in the right surface film 207 (not shown schematically in FIG. 6C), as in the left surface film 206, it is possible to suppress the occurrence of the vertical fold 300 (not shown schematically in FIG. 6C).

As explained above, at the coupling portion on the lateral face in the storage bag of the present embodiment, the convex portion is provided. At the coupling portion on the lateral face, the movable area of the lateral face (gusset portion) is regulated at the portion at which the convex portion is provided compared to the portion at which the convex position is not provided, and therefore, the possibility of the occurrence of the vertical fold on the lateral face is suppressed.

Consequently, according to the storage bag of the present embodiment, it is possible to suppress the occurrence of the vertical fold at the gusset portion.

Variant Example

Figure 7:
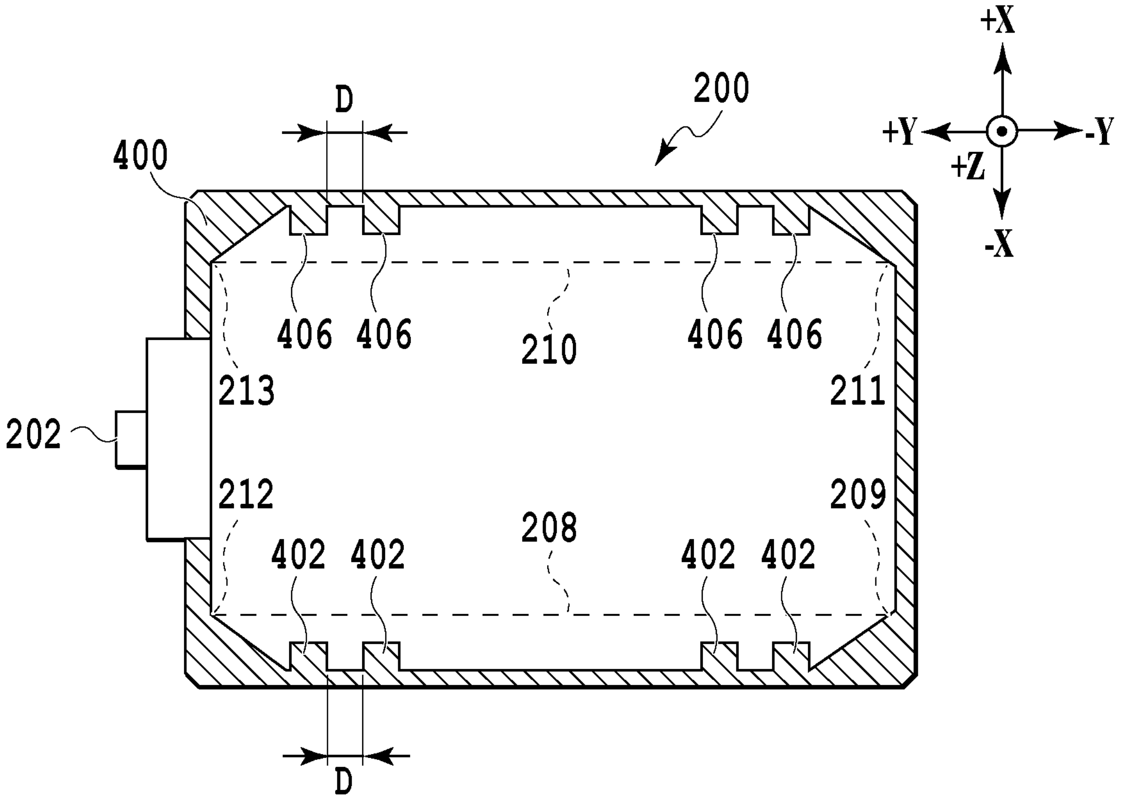
FIG. 7 is a diagram showing a variant example of a coupling portion.

FIG. 7 is a diagram showing a variant example of the coupling portion 400 in the first embodiment.

As shown in FIG. 7, it is preferable for a plurality of the first convex portions 402, a plurality of the second convex portions 404 (not shown schematically in FIG. 7), a plurality of the third convex portions 406, and a plurality of the fourth convex portions 408 (not shown schematically in FIG. 7) to be provided concentratedly at positions at which the vertical fold 300 is likely to occur.

In the present variant example, within a range not less than about ten mm and not more than about seventy mm from the first end portion 209 toward the inside of the first folding line 208, the two first convex portions 402 and the two second convex portions 404 (not shown schematically in FIG. 7) are provided. Within a range not less than about ten mm and not more than about seventy mm from the third end portion 212 toward the inside of the first folding line 208, the two first convex portions 402 and the two second convex portions 404 (not shown schematically in FIG. 7) are provided.

On the other hand, within a range not less than about ten mm and not more than about seventy mm from the second end portion 211 toward the inside of the second folding line 210, the two third convex portions 406 and the two fourth convex portions 408 (not shown schematically in FIG. 7) are provided. Within a range not less than about ten mm and not more than about seventy mm from the fourth end portion 213 toward the inside of the second folding line 210, the two third convex portions 406 and the two fourth convex portions 408 (not shown schematically in FIG. 7) are provided.

In the example in FIG. 7, the size of each of the first convex portion 402, the second convex portion 404, the third convex portion 406, and the fourth convex portion 408 is the same but the size of each of them may be changed. For example, the protrusion amount of each of the first convex portion 402, the second convex portion 404, the third convex portion 406, and the fourth convex portion 408 may be changed, or the width of each of the first convex portion 402, the second convex portion 404, the third convex portion 406, and the fourth convex portion 408 may be changed. Of course, it may also be possible to provide the first convex portion 402, the second convex portion 404, the third convex portion 406, and the fourth convex portion 408 whose sizes are different in combination.

Further, the influence of the vertical fold 300 that occurs at a position distant from the discharge port 202 on the used-up property of liquid is greater than that of the vertical fold 300 that occurs at a position close to the discharge port 202. Consequently, it may be possible to provide the first convex portion 402, the second convex portion 404, the third convex portion 406, and the fourth convex portion 408 only at positions distant from the discharge port 202 and it is not necessary to provide them in the vicinity of the discharge port 202.

By providing the first convex portion 402 and the third convex portion 406, the spread of the left surface film 206 (not shown schematically in FIG. 7) and the right surface film 207 (not shown schematically in FIG. 7) is suppressed partially. Because of this, it is considered that the maximum amount of liquid that can be stored in the storage bag 200 is reduced.

However, in a case when the size of each of the first convex portion 402 and the second convex portion 404 is the above-described size and the number of first convex portions 402 and the number of second convex portions 404 are each five or fewer for the first folding line 208, there is not a great influence on the storage amount of liquid. Similarly, also in a case when the size of each of the third convex portion 406 and the fourth convex portion 408 is the above-described size and the number of third convex portions 406 and the number of fourth convex portions 408 are each five or fewer for the second folding line 210, there is not a great influence on the storage amount of liquid. That is, in a case when the number of convex portions at the coupling portion for one folding line is ten or fewer and the size of each of these convex portions is the above-described size, there is not a great influence on the storage amount of liquid.

Consequently, it may be possible to appropriately determine the number of first convex portions 402, the number of second convex portions 404, the number of third convex portions 406, and the number of fourth convex portions 408 in accordance with the maximum amount of liquid that the storage bag 200 stores, the size of the gusset portion, the material of film, and the like.

Further, it may also be possible to determine an interval D between adjacent ones of the plurality of the first convex portions 402, an interval D between adjacent ones of the plurality of the second convex portions 404, an interval D between adjacent ones of the plurality of the third convex portions 406, and an interval D between adjacent ones of the plurality of the fourth convex portions 408 in accordance with the amount of liquid that is desired to be stored, or the like.

Further, it is preferable for the first convex portion 402 and the second convex portion 404 to be provided at positions symmetric with respect to the first folding line 208 in a state where the storage bag 200 is viewed from the left lateral face thereof. Similarly, it is preferable for the third convex portion 406 and the fourth convex portion 408 to be provided at positions symmetric with respect to the second folding line 210 in a state where the storage bag 200 is viewed from the right lateral face thereof.

It may also be possible to provide the first convex portion 402 and the second convex portion 404 at positions asymmetric with respect to the first folding line 208 in a state where the storage bag 200 is viewed from the left lateral face thereof. Similarly, it may also be possible to provide the third convex portion 406 and the fourth convex portion 408 at positions asymmetric with respect to the second folding line 210 in a state where the storage bag 200 is viewed from the right lateral face.

With the variant example of the storage bag as described above, it is possible to suppress the occurrence of a vertical fold at the gusset portion.

Second Embodiment

In the above-described embodiment, an explanation is given by supposing a case when a vertical fold occurs at the gusset portion on the left and right lateral faces, but a configuration in which the gusset portion is arranged at the bottom face may also be accepted. In a case when a vertical fold occurs at the gusset portion at the bottom face, it is also possible to apply the technique of the present disclosure. In the following explanation, to the configuration the same as or corresponding to that of the first embodiment, the same symbol is attached and at the same time explanation thereof is omitted and different points are explained mainly.

Figure 8:
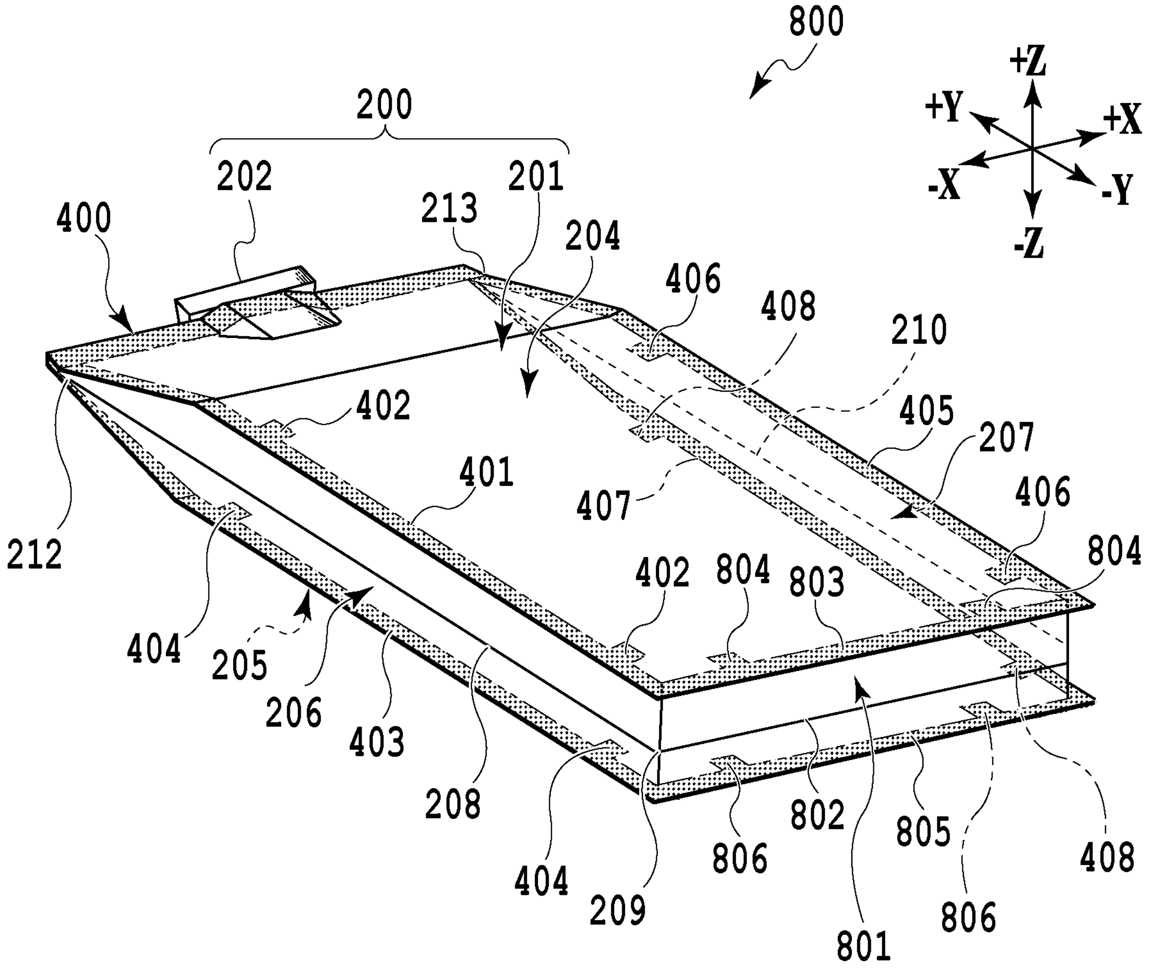
FIG. 8 is a perspective diagram of a storage bag, showing a coupling portion in one embodiment.

FIG. 8 is a perspective diagram of a second storage bag 800, showing the coupling portion 400 of the bag body 201 in the present embodiment.

As shown in FIG. 8, the bag body 201 of the present embodiment comprises a bottom face film 801 functioning as a gusset portion. As examples of the material of the bottom face film 801, there are polyethylene, polypropylene, and the like. In view of the gas-barrier property and the fastness property of the bottom face film 801, it is also possible to use a multilayer film including a plurality of materials, such as aluminum, PET, and nylon. By comprising the bottom face film 801, it is possible to make the capacity of the bag body 201 of the present embodiment larger than that of the first embodiment.

In the present embodiment, the top surface film 204 and the undersurface film 205 are connected via the bottom face film 801 double-folded along a third folding line 802.

The coupling portion 400 of the present embodiment includes a fifth area 803 coupling the end portion of the bottom face film 801 and the end portion of the top surface film 204 along the entire area in the second direction (X-direction) and a fifth convex portion 804 configured to protrude toward the inside of the top surface film 204 from the fifth area 803. The coupling portion 400 of the present embodiment includes a sixth area 805 coupling the end portion of the bottom face film 801 and the end portion of the undersurface film 205 along the entire area in the second direction (X-direction) and a sixth convex portion 806 configured to protrude toward the inside of the undersurface film 205 from the sixth area 805.

Depending on the posture of the bag body 201, it is considered that a vertical fold occurs in the bottom face film 801.

However, according to the configuration of the present embodiment, in the bottom face film 801, the movable area of the portion at which the fifth convex portion 804 and the sixth convex portion 806 are provided is smaller than that of the portion at which the fifth convex portion 804 or the sixth convex portion 806 is not provided. That is, the distance from the top surface film 204 to the undersurface film 205 at the portion at which the fifth convex portion 804 and the sixth convex portion 806 are provided is shorter than the distance at the portion at which the fifth convex portion 804 or the sixth convex portion 806 is not provided. As above, in the bottom face film 801 of the present embodiment, as the results of the movable area being suppressed, as in the case of the left surface film 206 and the right surface film 207, the occurrence of a vertical fold is suppressed.

Consequently, with the second storage bag 800, even in a case when the bottom face functions as a gusset portion, it is possible to suppress the occurrence of a vertical fold in the bottom face.

Other Embodiments

In the above embodiments, explanation is given by supposing the case when liquid is ink, but the liquid that can be applied to the technique of the present disclosure is not limited to ink. That is, it is possible to use various printing liquids including the processing liquid used for the purpose of improving the fixing property of ink, reducing gloss unevenness, improving scratch resistance in a printing medium, and so on.

In the above embodiments, an explanation is given by supposing the case when a vertical fold occurs because the discharge port is directed upward in the direction of gravity by a user in attaching a brand-new storage bag to a rigid case. In addition to this, a vertical fold may also occur in a case when the storage bag not used up yet is removed from the rigid case and the storage bag is stored temporarily by a user, and then the storage bag is mounted again on the rigid case.

Further, there is also a possibility that a vertical fold occurs in a case when a user replenishes the storage bag with liquid by injecting the liquid into the inside of the storage bag from the discharge port.

According to the storage bag of the present disclosure, it is possible to suppress the occurrence of a vertical fold at the gusset portion.

While the present disclosure has been described with reference to exemplary embodiments, it is to be understood that the disclosure is not limited to the disclosed exemplary embodiments. The scope of the following claims is to be accorded the broadest interpretation so as to encompass all such variations and equivalent structures and functions.

What is claimed is:

1. A storage bag comprising:

a bag body and a discharge port for discharging liquid stored in the bag body, wherein the bag body includes a first surface portion, a second surface portion opposite to the first surface portion, a third surface portion configured to serve as a gusset portion configured to connect the first surface portion and the second surface portion, and a fourth surface portion opposite to the third surface portion and configured to serve as a gusset portion configured to connect the first surface portion and the second surface portion, the first surface portion and the third surface portion are coupled by a first coupling portion configured to extend in a first direction, the first surface portion and the fourth surface portion are coupled by a second coupling portion configured to extend in the first direction, the first coupling portion includes a first convex portion configured to protrude toward the inside of the first surface portion along a second direction intersecting the first direction, the second coupling portion includes a second convex portion configured to protrude toward the inside of the first surface portion along the second direction, the second surface portion and the third surface portion are coupled by a third coupling portion configured to extend in the first direction, the second surface portion and the fourth surface portion are coupled by a fourth coupling portion configured to extend in the first direction, the third coupling portion includes a third convex portion configured to protrude toward the inside of the second surface portion along the second direction, the fourth coupling portion includes a fourth convex portion configured to protrude toward the inside of the second surface portion along the second direction, the first convex portion and the third convex portion are located at the same position in the first direction, and the second convex portion and the fourth convex portion are located at the same position in the first direction.

2. The storage bag according to claim 1, wherein, at the first coupling portion, the first surface portion and the third surface portion are coupled by welding or an adhesive agent, and, at the second coupling portion, the first surface portion and the fourth surface portion are coupled by welding or an adhesive agent.

3. The storage bag according to claim 1, wherein, at the first coupling portion, a distance the first convex portion extends in the first direction and in the second direction is not less than five mm and not more than thirty mm, and, at the second coupling portion, a distance the second convex portion extends in the first direction and in the second direction is not less than five mm and not more than thirty mm.

4. The storage bag according to claim 1, wherein the first convex portion is provided within a range extending not less than ten mm and not more than seventy mm in the first direction from the end portion of the third surface portion toward the inside of the third surface portion and the second convex portion is provided within a range extending not less than ten mm and not more than seventy mm in the first direction from the end portion of the fourth surface portion toward the inside of the fourth surface portion.

5. The storage bag according to claim 1, wherein, at the third coupling portion, the second surface portion and the third surface portion are coupled by welding or an adhesive agent, and, at the fourth coupling portion, the second surface portion and the fourth surface portion are coupled by welding or an adhesive agent.

6. The storage bag according to claim 1, wherein, at the third coupling portion, a distance the third convex portion extends in the first direction and in the second direction is not less than five mm and not more than thirty mm, and, at the fourth coupling portion, a distance the fourth convex portion extends in the first direction and in the second direction is not less than five mm and not more than thirty mm.

7. The storage bag according to claim 1, wherein the third convex portion is provided within a range extending not less than ten mm and not more than seventy mm in the first direction from the end portion of the third surface portion toward the inside of the third surface portion, and the fourth convex portion is provided within a range extending not less than ten mm and not more than seventy mm in the first direction from the end portion of the fourth surface portion toward the inside of the fourth surface portion.

8. The storage bag according to claim 1, wherein the total number of the number of first convex portions and the number of third convex portions is ten or less and the total number of the number of second convex portions and the number of fourth convex portions is ten or less.

9. The storage bag according to claim 1, wherein the first direction is a direction toward the discharge port from a bottom portion of the bag body.

10. The storage bag according to claim 1, wherein the first surface portion, the second surface portion, the third surface portion, and the fourth surface portion are configured by a film including at least one of polyethylene, polypropylene, aluminum, polyethylene terephthalate, and nylon.

11. The storage bag according to claim 1, wherein, as liquid is discharged from the bag body, the third surface portion and the fourth surface portion are folded up along a folding line extending in the first direction.

12. The storage bag according to claim 1, wherein the bag body further includes a fifth surface portion configured to serve as a gusset portion configured to connect the first surface portion, the second surface portion, the third surface portion, and the fourth surface portion, the first surface portion and the fifth surface portion are coupled by a fifth coupling portion configured to extend in the second direction, the second surface portion and the fifth surface portion are coupled by a sixth coupling portion configured to extend in the second direction, the fifth coupling portion includes a fifth convex portion configured to protrude toward the inside of the first surface portion along the first direction, and the sixth coupling portion includes a sixth convex portion configured to protrude toward the inside of the first surface portion along the first direction.

13. The storage bag according to claim 12, wherein the fifth convex portion and the sixth convex portion are located at the same position in the second direction.

14. The storage bag according to claim 12, wherein at the fifth coupling portion, the first surface portion and the fifth surface portion are coupled by welding or an adhesive agent, and, at the sixth coupling portion, the second surface portion and the fifth surface portion are coupled by welding or an adhesive agent.

15. The storage bag according to claim 12, wherein the fifth surface portion is configured by a film including at least one of polyethylene, polypropylene, aluminum, polyethylene terephthalate, and nylon.

16. The storage bag according to claim 12, wherein, as liquid is discharged from the bag body, the fifth surface portion is folded up along a folding line extending in the second direction.

17. A printing apparatus comprising:

a mounting unit capable of mounting a storage bag comprising a bag body and a discharge port for discharging liquid stored in the bag body; and a print head capable of printing an image on a printing medium by ejecting liquid discharged from the discharge port, wherein the bag body includes a first surface portion, a second surface portion opposite to the first surface portion, a third surface portion configured to serve as a gusset portion configured to connect the first surface portion and the second surface portion, and a fourth surface portion opposite to the third surface portion and configured to serve as a gusset portion configured to connect the first surface portion and the second surface portion, the first surface portion and the third surface portion are coupled by a first coupling portion configured to extend in a first direction, the first surface portion and the fourth surface portion are coupled by a second coupling portion configured to extend in the first direction, the first coupling portion includes a first convex portion configured to protrude toward the inside of the first surface portion along a second direction intersecting the first direction, the second coupling portion includes a second convex portion configured to protrude toward the inside of the first surface portion along the second direction, the second surface portion and the third surface portion are coupled by a third coupling portion configured to extend in the first direction, the second surface portion and the fourth surface portion are coupled by a fourth coupling portion configured to extend in the first direction, the third coupling portion includes a third convex portion configured to protrude toward the inside of the second surface portion along the second direction, the fourth coupling portion includes a fourth convex portion configured to protrude toward the inside of the second surface portion along the second direction, the first convex portion and the third convex portion are located at the same position in the first direction, and the second convex portion and the fourth convex portion are located at the same position in the first direction.

* * * * *